United States Patent
Karecha et al.

(10) Patent No.: US 8,984,637 B2
(45) Date of Patent: Mar. 17, 2015

(54) METHOD AND APPARATUS FOR DETECTING SHELLCODE INSERTION

(75) Inventors: Vinay Karecha, Brick Fields (MY); Hirosh Joseph, Brick Fields (MY)

(73) Assignee: F-Secure Corporation, Helsinki (FI)

(*) Notice: Subject to any disclaimer, the term of this patent is extended or adjusted under 35 U.S.C. 154(b) by 1203 days.

(21) Appl. No.: 12/653,604

(22) Filed: Dec. 15, 2009

(65) Prior Publication Data
US 2010/0162398 A1    Jun. 24, 2010

(30) Foreign Application Priority Data
Dec. 16, 2008 (MY) .................. PI20085086

(51) Int. Cl.
    G06F 21/00    (2013.01)
    G06F 21/52    (2013.01)
(52) U.S. Cl.
    CPC ................. G06F 21/52 (2013.01)
    USPC .......................... 726/24; 713/188
(58) Field of Classification Search
    CPC .................. G06F 21/52; G06F 21/55
    USPC ............................ 726/24; 713/188
    See application file for complete search history.

(56) References Cited

U.S. PATENT DOCUMENTS

| | | | |
|---|---|---|---|
| 5,557,742 A | 9/1996 | Smaha et al. | |
| 5,621,889 A | 4/1997 | Lermuzeaux et al. | |
| 5,798,706 A | 8/1998 | Kraemer et al. | |
| 5,805,801 A | 9/1998 | Holloway et al. | |
| 5,812,763 A | 9/1998 | Teng | |
| 5,892,903 A | 4/1999 | Klaus | |
| 5,983,348 A | 11/1999 | Ji | 713/200 |
| 6,243,805 B1 | 6/2001 | Mahurin | |
| 6,301,699 B1 | 10/2001 | Hollander et al. | |
| 7,058,822 B2 | 6/2006 | Edery et al. | 713/200 |
| 7,343,625 B1 | 3/2008 | Zaidi et al. | 726/25 |
| 7,409,717 B1 | 8/2008 | Szor | |
| 2006/0026677 A1 | 2/2006 | Edery et al. | 726/22 |
| 2006/0149968 A1 | 7/2006 | Edery et al. | 713/181 |
| 2009/0300764 A1* | 12/2009 | Freeman | 726/24 |
| 2010/0037317 A1* | 2/2010 | Oh | 726/23 |
| 2011/0030060 A1* | 2/2011 | Kejriwal | 726/25 |

OTHER PUBLICATIONS

Berners-Lee, et al., Adobe System, RFC 3986, Jan. 2005, 61 pages.*
Internet article, "X-Force Research & Development Newsletter", Oct. 2006, X-Force Newsletter, www.iss.net, 7 pgs.
Internet article, "Shellcode locations and buffer overflows in Windows", milw0rm.com/papers/205, Sep. 3, 2008, 7 pgs.
Internet article, "Smashing the Stock for Fun and Profit by Aleph One", insecure.org/stf/smachstack.html, vol. 7, Issue 49, 18 pgs.
Sotirov, A., Internet article, "Heap Feng Shui in JavaScript", phreedom.org/research/heap-feng-shui/heap-feng-shui.html, 20 pgs.
Malaysia Substantive Examination Adverse Report (dated Aug. 15, 2012) (Malaysia Application No. PI 20085086).

* cited by examiner

Primary Examiner — Justin T Darrow
(74) Attorney, Agent, or Firm — Harrington & Smith

(57) ABSTRACT

A method of detecting malware present on a computer system where the computer system is running an application. The method includes redirecting a function call, made by the application to a decoding function that performs decoding of an argument provided to it by an application, to a scanning function. The scanning function is then employed to scan an argument of the function call for suspect code or data. In the event that suspect code or data is detected, the function call is inhibited, otherwise program control is returned to the called decoding function.

15 Claims, 2 Drawing Sheets

METHOD AND APPARATUS FOR DETECTING SHELLCODE INSERTION

PRIORITY STATEMENT

This application claims priority under 35 USC §119 to Malaysian Patent Application No. PI20085086, filed on Dec. 16, 2008.

TECHNICAL FIELD

The present invention relates to a method and apparatus for detecting an attempt to insert malicious shellcode into the memory of a computer system.

BACKGROUND

Software applications present on a computer system, and in particular those applications that access the Internet, are vulnerable to attack. For example, a web browser application may be attacked when that application is used to download and view a web page from a remote server. An attacker may include so-called "shellcode" inside the web page and which comprises machine-code instructions that are written into the browser memory space. A remote shellcode is useful if an attacker wants to "browse around" the target system, but more often an attacker will just want to install some form of malware on the target system. In such cases, download and execute shellcode is often used: this type of shellcode does not spawn a shell, but rather instructs the machine to download a certain executable file off the network, save it to disk and execute it. Nowadays, this approach is commonly used in drive-by download attacks, where a victim visits a malicious webpage that in turn attempts to run such a download and execute shellcode in order to install software on the victim's machine.

An attacker will commonly inject a shellcode into the target process before or at the same time as it exploits a vulnerability to gain control over the program counter. The program counter is adjusted to point to the shellcode, after which the shellcode gets executed and performs its task. Injecting the shellcode is often done by storing the shellcode in data sent over the network to the vulnerable process, by supplying it in a file that is read by the vulnerable process, or through the command line or environment in the case of local exploits.

It can be difficult or even impossible to write a shellcode into memory at the precise location to which program control will jump (i.e. at a location where the program expects to find some valid instruction) and/or to take control of the program counter. To overcome this problem, attackers have very successfully exploited a technique known as "heap spraying". Briefly, heap spraying relies upon code within the downloaded data writing long strings of code, including multiple copies of the shellcode, into the heap memory, such that there is a high likelihood that a jump into the heap will result in the shellcode being executed. In the case of an attack exploiting a web browser, the heap spraying code is included as JavaScript code in the html web page. JavaScript code is executed by default by the web browser (or browser plugin) when it is present in a web page. [Of course, JavaScript is limited in what it can do to the system, so the actual malicious code is not implemented as JavaScript. Rather, JavaScript is merely used to write the shellcode to memory, and, if the program pointer can be caused to point to a copy of the shellcode, that is when the real damage is done.]

It can be fairly easy for an attacker to hide or obfuscate both the shellcode and the heap spraying code within a webpage, for example by using a "self-decoding" section of JavaScript. Using such an approach, the malicious JavaScript and shellcode is only "visible" once the JavaScript engine has been run, by which time the damage may be done. The self-decoding code may itself be varied so that it does not present a recognisable pattern. These measures together can defeat a simple scanning of the webpage for known malware signatures.

These and related issues are considered in the following Internet publications:

*Heap Feng Shui in JavaScript*, available as of Dec. 14, 2009 at http://phreedom.org/research/heap-feng-shui/heap-feng-shui.html *Smashing the Stack for Fun and Profit by Aleph One* (.o0 Phrack 49 o0o, volume severn issue forty-nine), available as of Dec. 14, 2009 at http://insecure.org/stf/smashstack.html

*DaRk-CodeRs Group production, kid* (English version, Sep. 3, 2008), available as of Dec. 14, 2009 at http://milw0rm.com/papers/205

*X-Force Research & Development Newsletter* (October 2006), available as of Dec. 14, 2009 at http://www.iss.net/documents/literature/X-ForceNews_Oct06.pdf

SUMMARY

According to a first aspect of the present invention there is provided a method of detecting malware present on a computer system where the computer system is running an application. The method comprises redirecting a function call, made by the application to a decoding function that performs decoding of an argument provided to it by an application, to a scanning function. The scanning function is then employed to scan an argument of the function call for suspect code or data. In the event that suspect code or data is detected, the function call is inhibited, otherwise program control is returned to the called decoding function.

Prior art approaches employing hooking of functions have focused on the vulnerable functions themselves, that is the functions which attackers can use to jump the program counter to the shellcode written to the memory. Embodiments of the present invention can allow an attack to be detected at an earlier stage, i.e. before the shellcode is written to the program memory.

The decoding function may be function that performs decoding of percent-encoded data. For example, the decoding function may be a JavaScript Unescape function.

The computer system may be a system implementing a Windows™ based operating system.

The application that is running on the computer system may be a web browser.

The step of redirecting the function call to a scanning function may be achieved by previously modifying said decoding function code to include a jump or call instruction pointing to said scanning function.

According to a second aspect of the present invention there is provided computer system comprising a first processing function for redirecting a call, made by the application to a decoding function that performs decoding of an argument provided to it by an application, to a scanning function. A second processing function is provided and employed to scan an argument of the function call for suspect code or data. A third processing function is provided for inhibiting the function call in the event that suspect code or data is detected, and for otherwise returning program control to the called decoding function.

According to a third aspect of the present invention there is provided a computer program for causing a computer system to redirect a function call, made by an application to a decoding function that performs decoding of an argument provided to it by an application, to a scanning function. The program further causes the scanning function to scan an argument of the function call for suspect code or data and, in the event that suspect code or data is detected, inhibits the function call, otherwise returns program control to the called decoding function.

DETAILED DESCRIPTION

Figure 1:
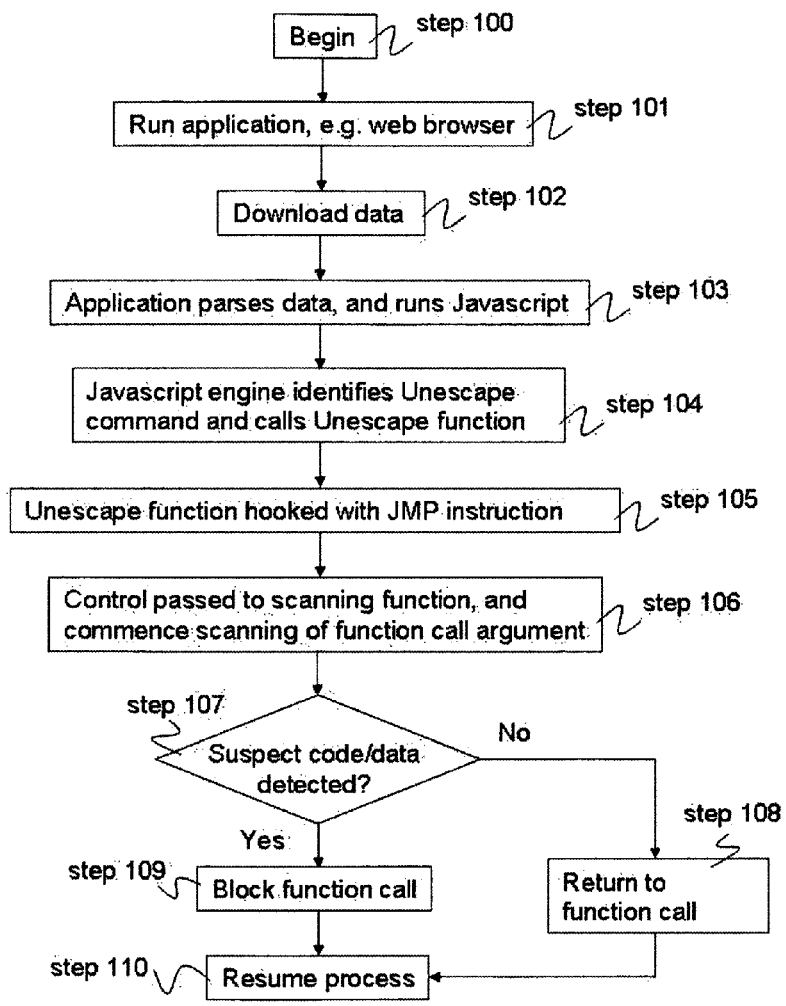
FIG. 1 is a flow diagram illustrating a procedure for detecting malicious shellcode.

As has already been discussed above, attackers may use shellcode, hidden within otherwise innocuous data (e.g. a web page), to cause a computer to misbehave, e.g. to download and execute further malicious code from an attacker's website. As has also been discussed, shellcode is typically written to the heap memory of the system, either to a specific location or using a heap spraying approach. Once the shellcode is written to the heap, code within the data takes advantage of a vulnerability (in the application or in a called function) to make the program counter jump to the shellcode.

Taking as an example a so-called "drive-by" attack, the shellcode will be contained as machine code instructions within html code of a webpage, and probably within a section of JavaScript code. Parts of the JavaScript code including the shellcode may be obfuscated by a "self-decoding" JavaScript code portion, preventing detection of the malware by means of a simple scan of the webpage data. In order to cause the shellcode to be written to the browser memory, an attacker may choose to include the machine code instructions as percent-encoded data and as an argument to an Unescape function. Percent-encoding can be used to encode both printable and non-printable characters (for example a carriage-return character) and derives its name from the fact that percent-encoded characters comprise a code number prefixed by a "%" symbol. When the JavaScript engine recognises the Unescape command, it will call the JavaScript Unescape function, providing the percent-encoded data as argument to the function.

Consider for example the following section of shellcode:
"B5 B0 B1 93 B6 73 7F 70 48 05 79 19 E1 7A 35 76".
In the downloaded webpage, this will be included as:
"Unescape("%B5%B0%B1%93%B6%737F%70%48%05%79%19%E1%7A%35%76")".

The use of the JavaScript Unescape( ) function to decode the shellcode presents a window of opportunity which can be exploited by a security application to analyse the shellcode, prior to a call being made to the vulnerable function itself (and which would result in the program counter jumping to the shellcode). More particularly, a detection approach is presented here which "hooks" the Unescape( ) function and parses the argument for shell-code patterns. As the argument to the Unescape( ) function will always be the percent-encoded shellcode, evasion techniques employing, for example, gzip encoding, chunked encoding or any other bypassing technique, will not be successful.

Hooking in programming is a technique employing so-called hooks to make a chain of procedures as an event handler. Thus, after the handled event occurs, control flow follows the chain in a specific order. The new hook registers its own address as handler for the event and is expected to call the original handler at some point, usually at the end. Each hook is required to pass execution to the previous handler, eventually arriving to the default one, otherwise the chain is broken. Unregistering the hook means setting the original procedure as the event handler.

Hooking can be used for many purposes, including debugging and extending original functionality. It can also be misused to inject (potentially malicious) code to the event handler—for example, rootkits try to make themselves invisible by faking the output of API calls that would otherwise reveal their existence.

A special form of hooking employs intercepting the library functions calls made by a process. Function hooking is implemented by changing the very first few code instructions of the target function to jump to an injected code. Alternatively, on systems using the shared library concept, the interrupt vector table or the import descriptor table can be modified in memory FIG. 1 is a flow chart illustrating the shellcode detection procedure. The Unescape function is hooked by inserting a five byte jump (JMP) instruction, pointing to the scanning or "trampoline" function, at the beginning of the Unescape function, such that calls to this function are redirected to the scanning function (DLL). The operational phase begins at step 100, with the application, e.g. web browser, being launched at step 101. Data, for example a web page, is downloaded at step 102. At step 103, the application parses the data and will identify, in the example of web browsing, the JavaScript contained in the page. At step 104 the JavaScript engine identifies the Unescape command, and calls the Unescape function. At step 105, the Unescape function is hooked by the (previously inserted) jump instruction, so that, at step 106, control is passed to the scanning function.

The scanning function then has available to it the argument provided to the Unescape function, that is the percent-encoded shellcode (assuming an attack). There is no need to decrypt the traffic for analysis (in contrast to a network scanning technique). As well as being foolproof to network/protocol based evasions, this approach is also foolproof against JavaScript parsing evasions. The approach is more efficient than network scanning technologies as it scans only required parameters.

The scanning function, which can be implemented for example as a DLL file, is configured to parse the argument that it receives for suspicious strings, step 107. For example, it may look for one or multiple occurrences of the NOP (no operation performed) instruction which, in machine-code corresponds to:
\x90\x90\x90\x90\x90\x90\x90\x90\x90\x90\x90\x90\x90\x90\x90 . . . .

The scanning function may be updated periodically by a network based server with signatures matching newly identified malware. Scanning may alternatively or additionally make use of rules or heuristics indicative of malware behaviour. As well as or in addition to hardcoding signatures and rules into the scanning function (DLL), the function may make use a database of signatures and rules which is updated dynamically as updates are pushed or pulled from a network server. This database approach is preferred as it reduces the maintenance burden on the system.

If the scanning function does not detect suspect code or data, then at step 108, control is returned to the called function and at step 110 the main process resumed. If however suspicious code or data is detected, the function call is blocked at step 109. Control is returned to the main process at step 110. In the case of a web browser application, this will likely result in an error being displayed in the web page.

Figure 2:
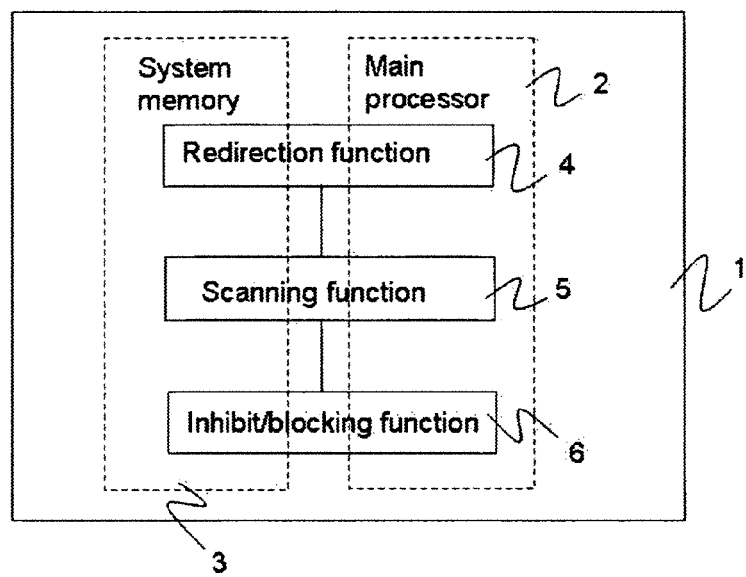
FIG. 2 illustrates hardware and software components of a computer system implementing the method of FIG. 1.

FIG. 2 illustrates schematically a computer system 1 comprising a main processor 2 and a main memory 3. The memory stores code that is executed by the main processor to implement a number of functions (in addition to a main application function, e.g. a web browser). A redirection function 4 is responsible for redirecting a call to a decoding function such as an Unescape function. In practice, the redirection function 4 handles the execution of a jump instruction inserted into the Unescape function. A scanning function 5 is responsible for scanning an argument or arguments passed to the decoding function as part of the call. The scanning function passes a result to a scanning decision function 6 (inhibit/blocking), which selects an action based upon the scanning result.

It will be appreciated by those of skill in the art that various modifications may be made to the above described embodiments without departing from the scope of the present invention. For example, a webpage downloaded over the Internet may include multiple Unescape( ) function calls. In this case, each such call will be scanned for malware (assuming a previous call does not terminate the process). The approach described above may be extended to calls made to functions other than the Unescape( ) function, but which also handle decoding of arguments passed to them by the application.

The invention claimed is:

1. A method of detecting malware present on a computer system where the computer system is running an application, the method comprising:
    redirecting a function call, made by the application to a decoding function that performs decoding of an argument provided to it by an application, to a scanning function;
    employing the scanning function to scan an argument of the function call for suspect code or data; and
    in the event that suspect code or data is detected, inhibiting the function call, otherwise returning program control to the called decoding function.

2. A method according to claim 1, wherein said decoding function is a function that performs decoding of percent-encoded data.

3. A method according to claim 2, wherein said decoding function is a JavaScript Unescape function.

4. A method according to claim 1, wherein said application is a web browser.

5. A method according to claim 1, wherein said step of redirecting the function call to a scanning function is achieved by previously modifying said decoding function code to include a jump or call instruction pointing to said scanning function.

6. A computer system comprising:
    a first processor for redirecting a call, made by the application to a decoding function that performs decoding of an argument provided to it by an application, to a scanning function;
    a second processor for employing the scanning function to scan an argument of the function call for suspect code or data; and
    a third processor for inhibiting the function call in the event that suspect code or data is detected, and for otherwise returning program control to the called decoding function.

7. A computer system according to claim 6, wherein said decoding function is a function that performs decoding of percent-encoded data.

8. A computer system according to claim 7, wherein said decoding function is a JavaScript Unescape function.

9. A computer system according to claim 6, wherein said application is a web browser.

10. A computer system according to claim 6, wherein said redirecting the function call to a scanning function is achieved by previously modifying said decoding function code to include a jump or call instruction pointing to said scanning function.

11. A non-transitory computer readable memory storing a computer program which when executed by at least one processor causes a computer system to:
    redirect a function call, made by an application to a decoding function that performs decoding of an argument provided to it by an application, to a scanning function;
    employ the scanning function to scan an argument of the function call for suspect code or data; and
    in the event that suspect code or data is detected, inhibit the function call, otherwise return program control to the called decoding function.

12. A non-transitory computer readable memory storing a computer program according to claim 11, wherein said decoding function is a function that performs decoding of percent-encoded data.

13. A non-transitory computer readable memory storing a computer program according to claim 12, wherein said decoding function is a JavaScript Unescape function.

14. A non-transitory computer readable memory storing a computer program according to claim 11, wherein said application is a web browser.

15. A non-transitory computer readable memory storing a computer program according to claim 11, wherein said redirecting the function call to a scanning function is achieved by previously modifying said decoding function code to include a jump or call instruction pointing to said scanning function.

* * * * *